United States Patent [19]

Brigand et al.

[11] 4,200,661

[45] Apr. 29, 1980

[54] GELLING COMPOSITIONS FOR FOOD PRODUCTS

[75] Inventors: Gérard Brigand; Horst Kragen; Robert Rizzotti, all of Carentan, France

[73] Assignee: Société CECA S.A., Velizy Villacoublay, France

[21] Appl. No.: 795,917

[22] Filed: May 11, 1977

[30] Foreign Application Priority Data

May 12, 1976 [FR] France ............................... 76 14240
Jul. 9, 1976 [FR] France ............................... 76 21063

[51] Int. Cl.² ........................... A23C 9/10; A23L 2/02
[52] U.S. Cl. .................................. 426/573; 426/43; 426/577; 426/580; 426/583; 426/616; 426/654; 426/522
[58] Field of Search ............... 426/573, 575, 578, 579, 426/580, 583, 654, 522, 43, 616

[56] References Cited

U.S. PATENT DOCUMENTS

| | | | |
|---|---|---|---|
| 2,060,336 | 11/1936 | Hear et al. | 426/573 |
| 2,767,167 | 10/1956 | Opie et al. | 260/209 |
| 3,300,473 | 1/1967 | Christoffel et al. | 260/209 |
| 3,346,556 | 10/1967 | Foster | 260/209 |
| 3,539,363 | 11/1970 | Morgan et al. | 426/522 X |
| 3,556,810 | 1/1971 | Moirano | 426/573 |
| 3,721,571 | 3/1973 | Glicksman | 426/579 |
| 3,726,690 | 4/1973 | Schappner, Jr. | 426/583 |
| 3,784,712 | 1/1974 | Clicksman et al. | 426/573 |
| 4,046,925 | 9/1977 | Igoe | 426/573 |

FOREIGN PATENT DOCUMENTS

1388706 3/1975 United Kingdom.

OTHER PUBLICATIONS

Whistler et al., Industrial Gums, 2nd ed. Academic Press, N.Y., 1973, (pp. 107, 323-335, 493, 494, 518 & 519).

Primary Examiner—David M. Naff
Attorney, Agent, or Firm—Fleit & Jacobson

[57] ABSTRACT

A gelling composition used as a food gelling agent, in water or milk, and comprising a gelling mixture consisting of a first gelling agent which is a galactomannan and a second gelling agent which is an agar and/or a xanthane, wherein the galactomannan has undergone a depolymerization treatment so that its solution in water at 1% has a viscosity in the range of 10 and 1000 centipoises at 25° C.

10 Claims, 1 Drawing Figure

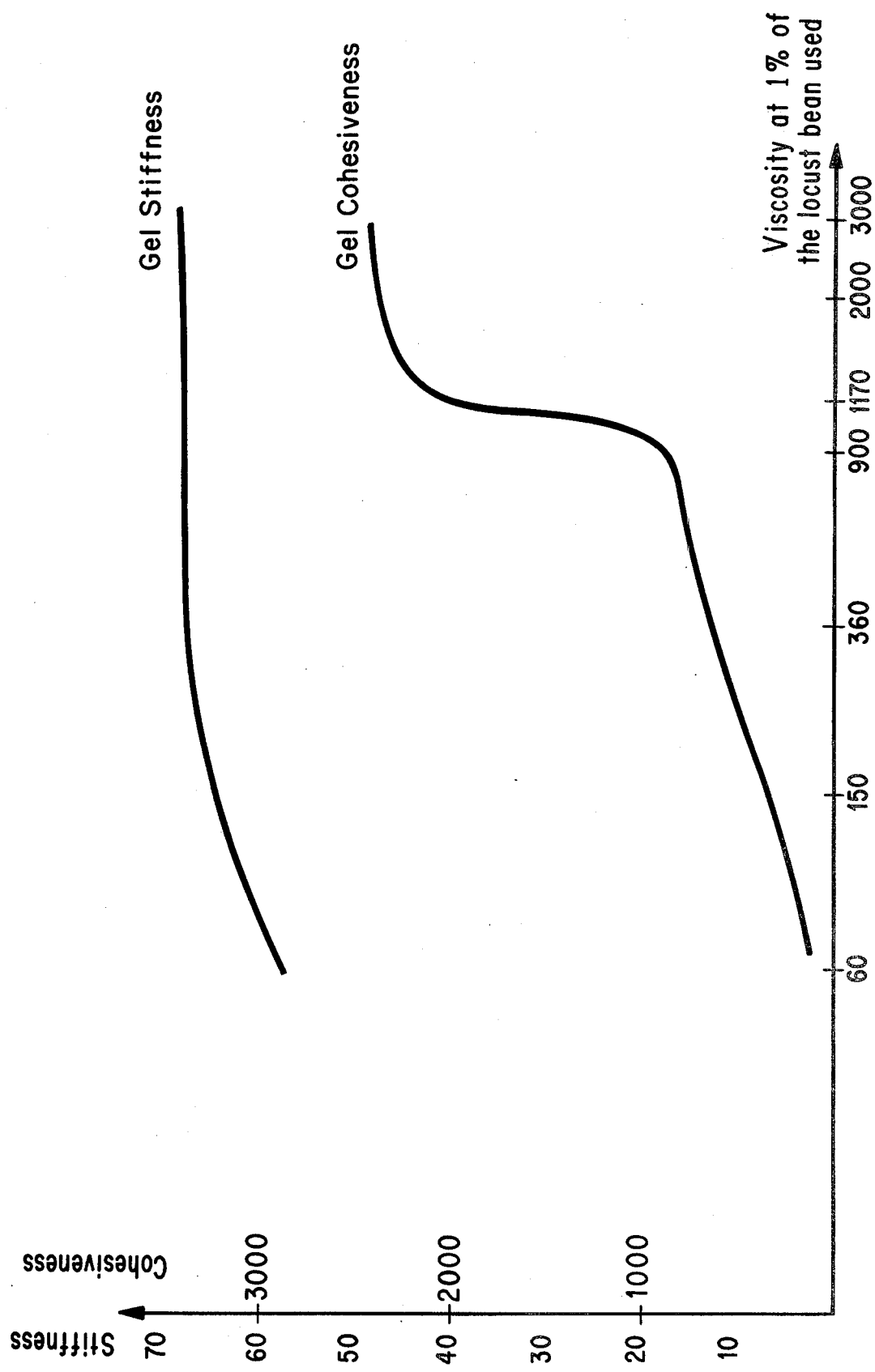

GELLING COMPOSITIONS FOR FOOD PRODUCTS

The present invention concerns the use, as a food gelling agent in water and milk, of a mixture of two gelling agents, the first being a galactomannan having undergone a depolymerization treatment so that its solution in water at 1% has a viscosity in the range of 10 and 1000 centipoises at 25° C., the second comprising agar and/or xanthane, eventually completed by another polysaccharide such as carraghenan, furcellaran or pectin.

In the same measuring conditions, the undepolymerized galactomannans form high viscosity solutions:

locust bean gum: 1200 to 3600 centipoises.

The invention also applies to new products which are the gels obtained from this gelling agent.

The gelling agents normally used to gel milk are sulphated polysaccharides: carraghenans, furcellarans and agars. The products give good results with a milk whose pH is close to 6. The use of an acidified milk whose pH is often close to 4 brings about a flocculation of the casein which deteriorates the aspect and quality of the product and makes it difficult to be eaten. This phenomenon is accentuated by the presence of sulphated polysaccharides which, chemically, precipitate with the casein in these pH conditions.

Research was therefore carried out to find improvements that could be made in the use of these gelling agents, particularly of agar.

The addition of a galactomannan, such as locust bean gum, to agar appears to avoid the precipitation of the casein, doubtlessly by a protecting colloid effect and to improve the texture but the gels obtained are stiff and do not have the organoleptic qualities currently designated by the term "mouth feel"; on using a quantity of galactomannan, such as locust bean gum, which is larger than that of agar, one partially remedies this disadvantage but the cohesiveness is still great and the gel has a disagreeable rubbery texture.

The applicant has found, and this constitutes the invention, that a gel of very agreeable consistency and having none of these disadvantages can be obtained by using a depolymerized galactomannan, i.e. whose depolymerization rate is reduced by physical, chemical or biochemical means. An easy method of achieving this depolymerization consists in the action in solution of hydrogen peroxide or of an acid. More precisely, the recommended depolymerization rate is such that the solution of the galactomannan in water at 1% has a viscosity in the range of 10 and 1000 centipoises at 25° C.

In addition, the mouth feel of the gel is again improved by using agar and the galactomannan in the form of a homogenized mixture obtained by coprecipitation by a solvent from the mixture of the agar extract and the galactomannan extract. Obtaining agar from its solution is normally carried out by congellation followed by decongelation; it is difficult to obtain the coagulation of agar in solution in water in good conditions by an organic solvent such as methyl alcohol, isopropyl alcohol and acetone. On the other hand, coagulation occurs perfectly if one uses a mixture of the two solutions of agar and galactomannan. Alcohol should preferably be used as a solvent.

Such a coagulation method allows one to obtain pure agar due to the fact that the coagulation by alcohol and the mixture obtained is in the form of a complex which assures homogeneity in the solubilization and the reactivity. It became apparent, and this also constitutes the invention, that one could obtain interesting results on substituting for agar, in part or in whole, a polysaccharide of microbic origin such as xanthane and on adding to it eventually another polysaccharide such as carraghenan, furcellaran or pectin. In this case, nevertheless, one obtains slightly more heterogeneous structures.

The invention in its entirety thus aims at using as a food gelling agent in water and milk a first gelling agent: depolymerized galactomannan, (1) for example locust bean gum, the latter having undergone a depolymerization treatment such that its solution in water at 1% has a viscosity in the range of 10 and 1000 centipoises at 25° C., and a second gelling agent constituted by agar and/or xanthane eventually completed by a polysaccharide such as carraghenan, furcellaran or pectin.

The utilized depolymerized galactomannan may be more particularly of a locust bean, tara or Espina corona base.

This composition is used as a food gelling agent of water or milk either at a pH close to 7 or after acidification; this acidification may be more particularly obtained by adding a fruit juice. In the case of milk, this acidification may be obtained by microbic action leading to a food product called yogurt.

Yogurt is a product having a certain gellified texture obtained by adding to milk, which is usually pasteurized, certain ferments which acidify the milk through a coagulation of the casein. The transformation is made at a temperature close to 40° C.

If the yogurt is preserved at an ambient temperature, the ferments continue their action, the acidity continues to develop, the product loses its qualities and its preservation is thereby limited.

This preservation is appreciably improved on destroying the ferments by heat; as this operation usually modifies the texture of the product, it is advisable to add a gelling agent to palliate this disadvantage; this addition is usually made to milk before pasteurization or to yogurt after fermentation.

This heating, currently called thermization, is nevertheless limited to approximately 70° C. with common gels. Beyond this temperature, the protecting effect shades off and the casein undergoes a dehydration process leading to a heterogeneous texture which is characteristically "sandy" and very disagreeable which can lead to a total separation if the temperature rises too much.

It has been found, and this constitutes an advantage of the invention, that, due to the gelling agent which is the subject of the invention, yogurt can be treated at very much higher temperatures while preserving the product's complete homogeneity. This thermization at a higher temperature, i.e. higher than 70° C. allows a longer preservation period on assuring a better destruction of the ferments.

Thermization can be carried out either directly on the product which is then conditioned in the most aseptic way possible, or on the product which has been previously put into hermetically-sealed containers.

The product may be yogurt by itself or yogurt mixed with other dairy products: fresh cheese or cottage cheese; or non-dairy products: fruit, jams, preserved fruit, vegetables, seasoning herbs and spices as well as with sugar, salt, flavourings, colourings, etc.

The invention will be better understood by means of the following examples in which manufactured gelling agents are used according to the following methods.

PREPARATION OF A DEPOLYMERIZED LOCUST BEAN EXTRACT 30 kg of locust bean meal are introduced by stirring into 2 m³ of water at 80° C. Once the gum has been well solubilized, one heats to 90° C. on adding 0.6 liter of hydrogen peroxide at 110 volumes.

One measures the viscosity at regular intervals. After 4 hours, the viscosity is of 200 centipoises. A concentration check indicates that one has about 1% of soluble locust bean gum. One then filters through a press filter with 13 kg/m³ of a filtering agent. The clear solution thus obtained is cooled to 40° C.

In the same conditions, one may also use 33 kg of locust bean splits instead of 30 kg of locust bean meal and obtain the same results.

One may also carry out a similar treatment by using sulphuric acid instead of hydrogen peroxide until one obtains a pH of 4. At the end of 5 hours, a viscosity close to 200 centipoises is obtained; one may then stop the degradation by neutralization and end the treatment as in the previous case.

PREPARATION OF AN AGAR EXTRACT

The agar extract solution is obtained by known industrial methods. 35 kg of seaweed (Gracilaria, Gelidium or Pterocladia) are washed by immersion in 500 liters of water for 2 hours. The seaweeds are then treated under pressure at 110° C. for 6 hours with 1 m³ of water. They are sieved and the solution is filtered through a press filter with 12 g/l of a filtering agent.

One thus obtains a solution containing about 1% of agar.

COAGULATION BY ALCOHOL OF THE MIXTURE OF THE TWO SOLUTIONS

The solution of the depolymerized locust bean extract and that of the agar extract are mixed proportionally according to the finally desired mixture. For example: 1 volume of agar solution at 1% and 3 volumes of locust bean solution at 1%, 4 volumes of the previous mixture are brought to a temperature of 50° C. and are poured into 7 volumes of isopropyl alcohol (azeotrope); the depolymerized agar-locust bean gum complex separates in the form of fibres which are pressed, washed, dried and crushed.

One may also coagulate 4 volumes of the previous mixture by 6 volumes of methanol and acetone.

EXAMPLE 1

INTEREST OF THE DEPOLYMERIZATION OF LOCUST BEAN GUM: IMPROVEMENT OF THE ORGANOLEPTIC QUALITIES

Solutions of more or less depolymerized locust bean gum were coagulated with an agar solution to obtain a final mixture containing 25% of agar and 75% of locust bean gum. The depolymerization of the locust bean gum was measured by taking a sample of its solution and coagulating it; after drying, the viscosity at 1% of this locust bean extract was measured. The complexes obtained were used at 1% to make water gels by dissolution on boiling and cooling of the solution.

The characteristics of the obtained gels are measured in two ways:

on the one hand, the gel stiffness measured by the force required for sinking a 1.1 cm diameter piston to a depth of 4 mm into the gel;

on the other hand, the gel cohesiveness measured by the force required to crush the unmoulded gel 6 cm in diameter and 4 cm high with a 10 cm diameter plate.

| Viscosity at 1% of the locust bean extract contained in the complex centipoises | Gel stiffness grams | Gel cohesiveness grams |
|---|---|---|
| 60 | 58 | 120 |
| 150 | 64 | 350 |
| 360 | 69 | 620 |
| 900 | 68 | 900 |
| 1170 | 69 | 2100 |
| 2000 | 69 | 2500 |
| 3000 | 70 | 2400 |

The corresponding curves are shown in the FIGURE.

These results show that in an agar-locust bean gum gel:

the gel stiffness varies little with the depolymerization rate of the locust bean used;

the gel cohesiveness varies with the depolymerization rate of the locust bean gum.

In addition, it has been established in tests carried out by the Applicant, and for different proportions of agar and locust bean gum, that the locust bean gums having viscosities higher than 1000 centipoises give a very great cohesiveness which is expressed on tasting by the rather disagreeable sensation of an elastic block;

the locust bean gums having viscosities in the range of 300–800 centipoises gives less cohesiveness and more melting on tasting;

the locust bean gums having a viscosity lower than 300 centipoises give even more melting on tasting but the gels sometimes become more difficult to unmould.

EXAMPLES OF ACID MILK GELS

The stability of the depolymerized agar-locust bean gum complex in an acid medium makes it particularly interesting in acid milk gels. In addition, below the isoelectric point of the milk (of the casein), the utilization of the complex avoids casein precipitation.

On the one hand, the depolymerized agar and locust bean gum, being practically neutral, do not coprecipitate with the milk casein, as opposed to the carraghenans or the furcelleran which are the usual dairy gelling agents, at least in a neutral medium.

On the other hand, the depolymerized agar and locust bean gum prevent casein precipitation on playing the role of the protecting colloid.

From the manufacturing point of view, the precipitation of acid milk gels is comprised of two stages.

FIRST STAGE: PREPARATION OF THE NEUTRAL SOLUTION CONTAINING THE GELLING AGENT

The gelling agent, the sugar and the other ingredients, except the acid, are dispersed in fresh or reconstituted milk. The mixture is treated thermally to put the various ingredients in solution and to sterilize the product partially or totally. This treatment may be the standard pasteurization treatment in a vat or by heat-exchangers or sterilization by steam injection (UHT) or any other very high temperature treatment by heat-exchanger or friction. The temperatures used vary from 80° to 150° C. The mixture is then cooled between 50° and 80° C. at a temperature higher than the gelification temperature.

SECOND STAGE: ADDITION OF THE ACID PHASE

The acid phase may be constituted by
(A) a food acid in solution;
(B) a fruit juice, concentrated or not, containing the pulp or not;
(C) a dairy product acidified by fermentation such as yogurt, or any other treatment.

This acid phase is added to the neutral solution containing the gelling agent and kept at a temperature between 50° C. and 80° C. by stirring or any other form of mixture, to prevent the pH of the medium from falling locally below 4.

The product is then heat-conditioned. It gels during cooling. One may also cool it below the gelification temperature before conditioning. This cooling may be carried out by stirring, either in a vat or passing through a heat-exchanger, and one then obtains a non-gelled product of the dessert-cream or liégois type.

EXAMPLE 2

ACIDIFICATION BY ADDING A FOOD ACID

| Basic formula : | | |
|---|---|---|
| Neutral phase | milk having a 1.5% fat content | 81.56 |
| | sugar | 16 |
| | fruit flavouring | 1 |
| | fruit colouring | 0.04 |
| | depolymerized agar-locust bean gum complex | 0.6 |
| Acid phase | citric acid | 0.8 (in solution at 50%) |
| Final pH | | 4.3 to 4.5 |

Operational method: the gelling agent, previously mixed with sugar, is dispersed in the milk. The mixture is heated to 80° C. and then sterilized by passing through a UHT sterilizer by steam injection at 147° C. for 3 seconds and cooled at 60° to 70° C., at which temperature the acid phase is added.

If one wishes to avoid the degradation of the flavouring by high-temperature treatment, this must be included in the acid phase.

One then conditions rapidly and then cools: a demouldable acid milk gel having a very smooth and melting texture is obtained.

EXAMPLE 3

The same as Example 2 but one cools by passing through a scraped-surface type of heat-exchanger at 10° C. before conditioning. A smooth and oily acid milk cream is obtained.

EXAMPLE 4

ACIDIFICATION BY ADDING A CONCENTRATED FRUIT JUICE

| Basic formula : | | |
|---|---|---|
| Neutral phase | milk having a 1.5% fat content | 78.38 |
| | sugar | 16 |
| | fruit colouring | 0.02 |
| | depolymerized agar-locust bean gum complex | 0.6 |
| Acid phase | concentrated fruit juice | 5 |
| Operational method : the same as Example 2. | | |

EXAMPLE 5

Composition is the same as Example 4 but the operational method is that of Example 3.

EXAMPLE 6

ACIDIFICATION BY ADDING AN ACID DAIRY PRODUCT

| Basic formula : | | |
|---|---|---|
| Neutral phase | milk having a 1.5% fat content | 20 |
| | sugar | 5 |
| | depolymerized agar-locust bean gum complex | 0.6 |
| Acid phase | yogurt | 74.4 |
| Operational method : the same as Example 2 but the acid phase must firstly be carried to, or maintained at, 40°-45° C. | | |

EXAMPLE 7

Composition is the same as Example 6 but the end of the Example 3 operational method is used.

One may thus obtain a product related to the mixed yogurts. The three compositions of the acid phase may also be used in combination. For example:

A+B: the flavouring is contributed by the fruit juice or the pulp but the acidity is strengthened by the addition of a food acid;

C+B: the flavouring is modified by the addition of the pump or the fruit juice which may or may not be concentrated;

C+A: the acidity is strengthened by the addition of a food acid.

The products thus obtained, due to their acidity and the preparation technique, have a better preservation than the neutral dairy products. Their shelf-life between manufacture and consumption may be extended without risk.

EXAMPLES OF ACID WATER GELS

The gelling agents used to obtain, in an acid medium, an eatable gel having a non-brittle texture, such as the carraghenans and gelatine, have the defect of depolymerizing strongly during the thermic treatments indispensable to their preparation. This depolymerization is a function of the acidity and makes those products unusable at pH lower than 3.6. The gelling agent, the object of the invention, has a better behaviour in an acid medium and allows one to obtain elastic and oily gels at relatively low pH. In the case of fruit water gels, these conditions of acidity favour the development of the fruit flavourings and the products obtained are superior to those usually prepared with the carraghenans or gelatine. The good behaviour in an acid medium allows the use of fruit juices.

EXAMPLE 8

WATER GELS WITH FOOD ACID

For 500 ml of water:
| | |
|---|---|
| Sugar | 85 grams |
| Strawberry flavouring | 1.5 |
| Strawberry coulouring | 0.02 |
| Citric acid | 1 |
| Depolymerized agar-locust bean gum complex | 4 |

Operational method - premix the powders, add them to boiling water, bring to boiling point and pour.
The gel is transparent, elastic and onctuous.
Final pH = 3.3.

EXAMPLE 9

GELS WITH FRUIT JUICES

| | |
|---|---|
| Sugar | 15 |
| Concentrated juice with or without pulp | 25 |
| Water | 58.8 |
| Depolymerized agar-locust bean gum complex | 1.2 |

Operational method - premix the sugar and the gelling agent, disperse in water, bring to boiling point. Add the concentrated juice at 80°-90° C. and condition.

EXAMPLES OF YOGURTS

The polysaccharide-galactomannans mixtures which may be chosen for use in the preparation examples given below are the following:

| | | |
|---|---|---|
| 1 | Depolymerized locust bean gum | 70 |
| | Agar | 30 |
| 2 | Depolymerized locust bean gum | 65 |
| | Xanthane | 35 |
| 3 | Depolymerized locust bean gum | 55 |
| | Pectin | 45 |
| 4 | Depolymerized locust bean gum | 75 |
| | Agar | 20 |
| | Carraghenan | 5 |
| 5 | Depolymerized locust bean gum | 55 |
| | Agar | 10 |
| | Pectin | 35 |

EXAMPLE 10

(a) PREPARATION OF THE YOGURT

The yogurt is prepared in a standard manner. 3 kg of milk power are added to 100 liters of milk; the milk is heated for several minutes at 90° C. or sterilized by passing through a UHT sterilizer, then homogenized. The enriched milk may also be prepared by light concentration after thermic treatment of the initial milk on vacuum cooling.

The milk thus obtained is cooled at 40°-45° C. The ferments are added and are left to act until the desired acidity is obtained. The maintenance time is variable according to the chosen ferments and temperatures.

The obtained yogurt may be cooled or not to prolong its shelf-life. The ferments stop acting when the temperature is lower than 10° C.

(b) ADDITION OF THE GELLING AGENT

Formula of the product: 99.6% yogurt; 0.4% of a gelling mixture according to the invention.

The gelling agent is added by vigorously stirring it into the yogurt. The mixture is heated in a vat at 95° C. and maintained for a period ranging from several minutes to 1 hour. During all these heating operations, one must ensure that the difference in temperature between the product and the heating fluid is as small as possible.

(c) The mixture is homogenized or not and put into pots at high temperature to maintain the sterility. The gelification, giving the product is traditional yogurt look, takes place during cooling.

EXAMPLE 11

Stages (a) and (b) are the same as those of Example 10.

(c) After heating at 95° C., the product is treated at a very high temperature in a heat-exchanger (of the plate, tubular or scraped-surface type). Provided that the difference in temperature between the product and the heating fluid is very small, the product may be carried to 100°-110° C.

After cooling between 90°-70° C., the product should be preferably homogenized. It can also be conditioned aseptically to increase its shelf-life.

EXAMPLE 12

Stages (a) and (b) are the same as those of Example 10.

(c) The product (homogenized or not) is conditioned in pots or metal boxes. The containers are kept at temperatures up to 110° C. in static autoclaves for a time to be determined as function of the desired sterility.

EXAMPLE 13

Stages (a) and (b) are the same as those of Example 10.

(c) The obtained product is cooled to 60° C. then mixed with other dairy products such as fresh cheese and cottage cheese (fat or non-fat) in variable proportions of each ingredient.

Formula: stabilized yogurt 50% (49.2% yogurt, 0.8% gelling agent); fresh cheese having a 2% fat content: 50%.

The mixture is than heated as in Example 11 by passing through heat-exchangers up to 100° C. or directly put into pots and heated as in Example 12 up to 100° C.

Apart from the gelling agent, only dairy products have been used in these examples.

All types of products can be prepared on adding to the yogurt, or to the yogurt-fresh cheese mixture, one or several of the following ingredients: sugar, flavourings, colourings, fruit, jam, preserved fruit, salt, vegetables, spices, seasoning herbs.

EXAMPLE 14

One operates as in Examples 10-13 with the following formula:
yogurt: 89.6
gelling agent: 0.4
sugar: 10

The gelling agent is premixed with the sugar which facilitates its dispersal in the yogurt.

EXAMPLE 15

One operates as in Examples 10-13 with the following formula:
yogurt: 81.6
sliced fruit: 10
gelling agent: 0.4 sugar: 8

The fruit may be added during the maintenance time at 95° C.

EXAMPLE 16

One operates as in Example 13 with the following formula:
yogurt: 41.5
fresh cheese having a 20% fat content: 40
preserved fruit: 18
gelling agent: 0.5
but one adds the preserved fruit at the same time as the fresh cheese.

EXAMPLE 17

One operates as in Examples 10–12 with the following formula:
yogurt: 84.5
preserved fruit: 15
gelling agent: 0.5

The preserved fruit is added during the maintenance time at 95° C.

EXAMPLE 18

One operates as in Example 13 with the following formula:
yogurt: 48.5
fresh cheese having a 20% fat content: 48.5
dried seasoning herbs: 0.5 to 1
gelling agent: 0.5
salt: 2

The salt and the seasoning herbs are mixed with the gelling agent and dispersed in the yogurt. They may also be added to the fresh cheese before adding to the yogurt.

What we claim is:

1. A gelling composition for use as a food gelling agent in water or milk comprising a first gelling agent which is a galactomannan selected from the group consisting of locust bean, tara and Espina Corona and a second gelling agent which is at least one of an agar and a xanthane, wherein the galactomannan has been submitted to a depolymerization treatment so that its polymerization rate is such that a 1% aqueous solution of the galactomannan has a viscosity from about 300 to 800 centipoises at 25° C., the gelling composition being obtained by precipitation of the two gelling agents from a mixture of their solutions, and the amount of galactomannan being between about 1 and 9 times the amount of the second gelling agent.

2. The gels obtained from a gelling composition according to claim 1 when used in acidified water at a concentration rate between about 0.1 and 4%.

3. The gels obtained from a gelling composition according to claim 1 when used in fruit juice at a concentration rate between about 0.1 and 4%.

4. The gels obtained from a gelling composition according to claim 1 when used in acidified milk at concentration rate between 0.1 and 4%.

5. The gels set forth in claim 4, wherein the acidified milk is a yogurt.

6. The gel of claim 5 which has been subjected to a thermic treatment at a temperature higher than 70° C. after mixing to produce a gel having a longer preservation period.

7. The gelling composition of claim 1 wherein the second gelling agent also comprises a polysaccharide selected from the group consisting of carraghenan, furcellaran or pectin.

8. The gelling composition of claim 1 which is obtained by precipitation of the two gelling agents from a mixture of their solutions by means of an organic liquid.

9. A method for preparing a food gel product in water or milk from food ingredients including an acid constituent comprising the steps of forming a depolymerized extract of locust bean gum so that a 1% aqueous solution of said depolymerized extract has a viscosity from about 10 to 1000 centipoises at 25° C., adding said depolymerized solution to agar so the amount of depolymerized locust bean gum is between about 1 and 9 times the amount of the amount of agar, mixing the resulting solution with the food ingredients except the acid constitutent, thermically treating the resulting mixture at a temperature greater than 80° C. to about 150° C., cooling said mixture to from about 50° C. to less than 80° C., adding said acid constituent while maintaining the temperature from about 50° to 80° C., packaging and cooling.

10. The method of claim 9 wherein the acid constituent is selected from the group consisting of acidified water, fruit juice and acidified milk.

* * * * *